US012784937B1

(12) United States Patent
Doyle et al.

(10) Patent No.: US 12,784,937 B1
(45) Date of Patent: Nov. 3, 2026

(54) COAXIAL CABLE WITH FLEXIBLE MAGNETIC SHIELD

(71) Applicant: Keysight Technologies, Inc., Santa Rosa, CA (US)

(72) Inventors: Paul Doyle, Colorado Springs, CO (US); Wilson Jang, Penang (MY); Chai Hoon Teoh, Penang (MY); Teck Liong Choong, Singapore (SG); Mur Har Khong, Penang (MY)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 181 days.

(21) Appl. No.: 18/416,743

(22) Filed: Jan. 18, 2024

Related U.S. Application Data

(60) Provisional application No. 63/442,276, filed on Jan. 31, 2023.

(51) Int. Cl.
*H01B 11/18* (2006.01)
*H01B 17/58* (2006.01)
*H01B 17/60* (2006.01)

(52) U.S. Cl.
CPC ..... *H01B 11/1869* (2013.01); *H01B 11/1878* (2013.01); *H01B 11/1895* (2013.01); *H01B 17/58* (2013.01); *H01B 17/60* (2013.01)

(58) Field of Classification Search
CPC .......... H01B 7/04; H01B 7/0045; H01B 7/29; H01B 9/02; H01B 9/006; H01B 9/0066; H01B 9/007; H01B 9/023; H01B 11/06; H01B 11/183; H01B 11/1869; H01B 11/1878; H01B 11/1185; H01B 17/58; H01B 17/60; H05K 9/0098; H05K 9/0075
USPC ........... 174/36, 74 A, 75 B, 76, 77 R, 102 R, 174/115, 350, 359, 360; 333/12, 79, 174, 333/175, 176, 181, 185, 243, 244–247
See application file for complete search history.

(56) References Cited

U.S. PATENT DOCUMENTS 2,228,797 A * 1/1941 Wassermann ........ H01B 11/146 178/45
2,243,881 A * 6/1941 Peters ................ H01B 11/1856 174/397
4,149,170 A * 4/1979 Campbell ................ H01Q 1/52 343/885

(Continued)

OTHER PUBLICATIONS

Guoping Zheng et al., "Study on the Universal Tapered Segmental Ring Assembly Simulation Algorithm and Deviation Assessment: A Case Study on Metro Line Tunnel," Hindawi,Advances in Civil Engineering, vol. 2021, Dec. 2021,Article ID 9975848, pp. 1-14.

(Continued)

*Primary Examiner* — William H. Mayo, III

(57) ABSTRACT

A cable assembly includes a coaxial cable, multiple ferrite beads positioned along a length of the coaxial cable in a longitudinal direction and surrounding an outer surface of the coaxial cable for enhancing electromagnetic shielding of the coaxial cable, a protective casing surrounding the ferrite beads and the coaxial cable, and at least one end space at a proximal end and/or a distal end of the cable assembly. The at least one end space is defined between the protective casing and the coaxial cable to allow movement of the ferrite beads in the longitudinal direction. The movement in the longitudinal direction enables flexing movements between the adjacent ferrite beads.

16 Claims, 12 Drawing Sheets

(56) References Cited

U.S. PATENT DOCUMENTS

| | | | | | |
|---|---|---|---|---|---|
| 4,399,419 | A * | 8/1983 | Dobrovolny | H01B 11/1895 333/260 |
| 4,638,272 | A * | 1/1987 | Ive | H01P 1/26 333/236 |
| 4,962,359 | A | 10/1990 | Dunsmore | |
| 5,334,955 | A * | 8/1994 | Strnad | H03H 1/0007 336/176 |
| 5,763,955 | A * | 6/1998 | Findley | H01L 23/528 430/311 |
| 5,933,117 | A * | 8/1999 | Gerhard | H01Q 7/08 343/788 |
| 6,346,671 | B1 * | 2/2002 | Ahrens | H01B 11/1834 174/102 R |
| 7,609,077 | B2 | 10/2009 | Campbell et al. | |
| 9,019,044 | B2 | 4/2015 | Richardson et al. | |
| 9,345,179 | B2 * | 5/2016 | Imahori | H05K 9/0066 |
| 9,823,284 | B2 | 11/2017 | Sterns et al. | |
| 10,302,676 | B2 * | 5/2019 | Mende | H01P 1/22 |
| 12,097,812 | B2 * | 9/2024 | Yokota | H01B 7/00 |
| 2016/0360654 | A1 * | 12/2016 | Nakatani | H01B 11/1025 |
| 2024/0118314 | A1 * | 4/2024 | Campbell | G01R 1/06755 |

OTHER PUBLICATIONS

3DEXPERIENCE—Universal Ring Concept for Tunnel YouTube, Apr. 19, 2018. Available: https://www.youtube.com/watch?v=pei_8gkvtUQ, 2 pgs.

"Coatings & Adhesives of Ferrite Magnets," stanfordmagnets.com. https://www.stanfordmagnets.com/coatings-adhesives-of-ferrite-magnets.html, Nov. 11, 2020, pp. 1-6.

* cited by examiner 130-4

556

556

COAXIAL CABLE WITH FLEXIBLE MAGNETIC SHIELD

CROSS-REFERENCE TO RELATED APPLICATION

The present application claims priority under 35 U.S.C. § 119(e) and under 37 C.F.R. § 1.78(a) to commonly owned U.S. Provisional Application No. 63/442,276 filed on Jan. 31, 2023. The entire disclosure of U.S. Provisional Application No. 63/442,276 is specifically incorporated herein by reference in its entirety.

BACKGROUND

Modern test and measurement (T&M) instruments, such as digital oscilloscopes, interface with probes for receiving radio frequency (RF) signals from devices under test (DUTs). Generally, a probe includes a probe tip with an RF connector at a distal end configured to electrically connect to the DUT, an interface at a proximal end for interfacing with the T&M instrument, and a flexible cable running the length of the probe for conducting the RF signals between the DUT and the T&M instrument. To conduct RF signals, the cable may include a coaxial cable for conducting the RF signals and ferrite bead elements positioned externally along the length of the coaxial cable for isolating the signal, e.g., from common mode interference. The ferrite beads may be spaced apart with compressible elastomeric material in between because complete enclosure of the coaxial cable in ferrite beads would render the cable assembly too rigid, impairing practical use of the probe. An example of a cable with ferrite beads separated by compressible elastomeric material is described by U.S. Pat. No. 10,302,676 to Mende et al., issued May 28, 2019.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
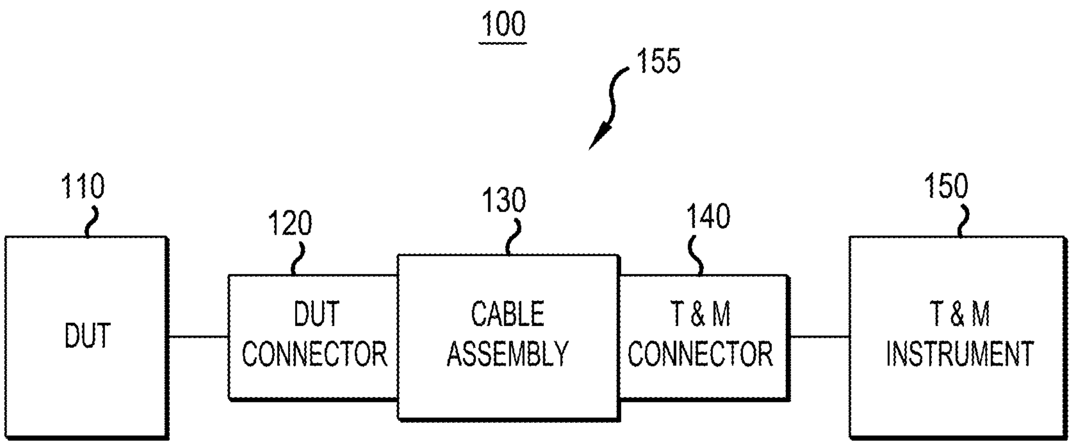
FIG. 1 is a simplified block diagram illustrating a system for performing testing and measurement of a DUT, including a flexible probe, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

Relative terms, such as "above," "below," "top," "bottom," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be "below" that element. Similarly, if the device were rotated by 90° with respect to the view in the drawings, an element described "above" or "below" another element would now be "adjacent" to the other element; where "adjacent" means either abutting the other element, or having one or more layers, materials, structures, etc., between the elements.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to a representative embodiment, a cable assembly includes a coaxial cable; multiple ferrite beads spaced apart from one another along a longitudinal length of the coaxial cable and surrounding an outer surface of the coaxial cable for enhancing electromagnetic shielding of the coaxial cable; and multiple rigid spacers arranged in gaps separating adjacent ferrite beads of the multiple ferrite beads, where a shape of each of the rigid spacers enables flexing movements between the adjacent ferrite beads. In various embodiments, each rigid spacer may include a tapered spacer tapering downward in a direction away from the outer surface of the coaxial cable, a low profile spacer having an outer diameter less than a thickness of each ferrite bead of the multiple ferrite beads, or a torus or toroid spacer having a rounded surface opposite the outer surface of the coaxial cable and another rounded surface adjacent the outer surface of the coaxial cable.

According to a representative embodiment, a cable assembly includes a coaxial cable and multiple ferrite beads spaced apart from one another along a length of the coaxial cable in a longitudinal direction for enhancing electromagnetic shielding of the coaxial cable. The ferrite beads are physically secured to an outer surface of the coaxial cable by an adhesive. Adjacent ferrite beads of the multiple ferrite beads sections are separated by empty air gaps, enabling flexing movements between the adjacent ferrite beads.

According to a representative embodiment, a cable assembly includes a coaxial cable; multiple ferrite beads spaced apart from one another along a length of the coaxial cable in a longitudinal direction and surrounding an outer surface of the coaxial cable for enhancing electromagnetic shielding of the coaxial cable; and multiple crushable spacers arranged in gaps separating adjacent ferrite beads of the multiple ferrite beads, enabling flexing movements between the adjacent ferrite beads. The crushable spacers are formed of a crushable electrically insulating material that is not elastomeric.

According to a representative embodiment, a cable assembly includes a coaxial cable; multiple ferrite beads slidably positioned along a length of the coaxial cable in a longitudinal direction and surrounding an outer surface of the coaxial cable for enhancing electromagnetic shielding of the coaxial cable; a protective casing surrounding the ferrite beads and the coaxial cable; and at least one end space at a proximal end and/or a distal end of the cable assembly, where the at least one end space is defined between the protective casing and the coaxial cable. The at least one end space allows movement of the plurality of ferrite beads in the longitudinal direction, enabling flexing movements between the adjacent ferrite beads.

According to a representative embodiment, a cable assembly includes a coaxial cable, multiple ferrite beads slidably positioned along a length of the coaxial cable in a longitudinal direction and surrounding an outer surface of the coaxial cable for enhancing electromagnetic shielding of the coaxial cable, a protective casing surrounding the multiple and the coaxial cable, and at least one end space at a proximal end and/or a distal end of the cable assembly. The at least one end space is defined between the protective casing and the coaxial cable. The at least one end space allows movement of the ferrite beads in the longitudinal direction, enabling flexing movements between the adjacent ferrite beads.

According to a representative embodiment, a cable assembly includes a coaxial cable and multiple ferrite beads arranged along a longitudinal axis of the coaxial cable for enhancing electromagnetic shielding of the coaxial cable. Each ferrite bead of the multiple ferrite beads has a tapered cross-sectional shape in a direction along the longitudinal axis, and is independently rotatable around the longitudinal axis enabling bending of the coaxial cable. Adjacent ferrite beads of the multiple ferrite beads are in contact with one another to prevent gaps between the adjacent ferrite beads.

According to a representative embodiment, a cable assembly includes a coaxial cable and multiple ferrite beads arranged along a longitudinal axis of the coaxial cable for enhancing electromagnetic shielding of the coaxial cable. Adjacent ferrite beads of the multiple ferrite beads are in contact to prevent gaps between the adjacent ferrite beads. Each ferrite bead of the multiple ferrite beads is shaped to enable bending of the coaxial cable when rotated around the longitudinal axis relative to at least one adjacent ferrite bead of the multiple ferrite beads.

FIG. 1 is a simplified block diagram illustrating a system 100 for performing testing and measurement of a DUT, including a flexible probe, according to a representative embodiment.

Referring to FIG. 1, system 100 includes a T&M instrument 150 and a probe 155 configured to connect the T&M instrument 150 to the DUT 110. The T&M instrument 150 may be any type of instrument that uses a probe for testing and measurement operations, such as an oscilloscope, a vector network analyzer (VNA) or a spectrum analyzer, for example. The T&M instrument 150 may include an analog front-end including signal conditioning circuitry, such as amplifiers and/or filters, for receiving and conditioning measurement signals from the DUT 110, an analog to digital converter (ADC) for digitizing the measurement signals, a processing unit for performing signal processing and analysis of the digitized measurement data output from the ADC, as would be apparent to one skilled in the art.

The probe 155 includes a cable assembly 130, an RF connector 120 at a distal end of the cable assembly 130, and a T&M connector 140 at a proximal end of the cable assembly 130. The RF connector 120 is configured to interface with the DUT 110, and may be implemented using any connector capable of coupling with the DUT 110 to conduct signals output by the DUT 110. For example, the RF connector 120 may be a 0.100" pitch spaced square pin connector (e.g., including either the socket side or the protruding pin side), a 0.200" pitch spaced square pin connector, a sub-miniature push-on (SMP) connector, a sub-miniature version A (SMA) connector, or a micro-miniature coaxial (MMCX) connector, a bayonet Neill-Concelman (BNC) connector, a threaded Neill-Concelman (TNC) connector, or a soldered connection, although other types of compatible connectors may be implemented without departing from the scope of the present teachings. The RF connector 120 may include an inner signal contact for conducting the signal and an outer contact (e.g., casing) for conducting a reference (e.g., ground). The signal may be a differential signal, for example.

The T&M connector 140 is configured to interface with the T&M instrument 150, and may be implemented using any connector capable of coupling with the T&M instrument 150 to conduct test signals. The T&M connector 140 may be a BNC connector, a TNC connector, an SMP connector, an SMA connector, or an MMCX connector, for example, although other types of compatible connectors may be implemented without departing from the scope of the present teachings.

Figure 2:
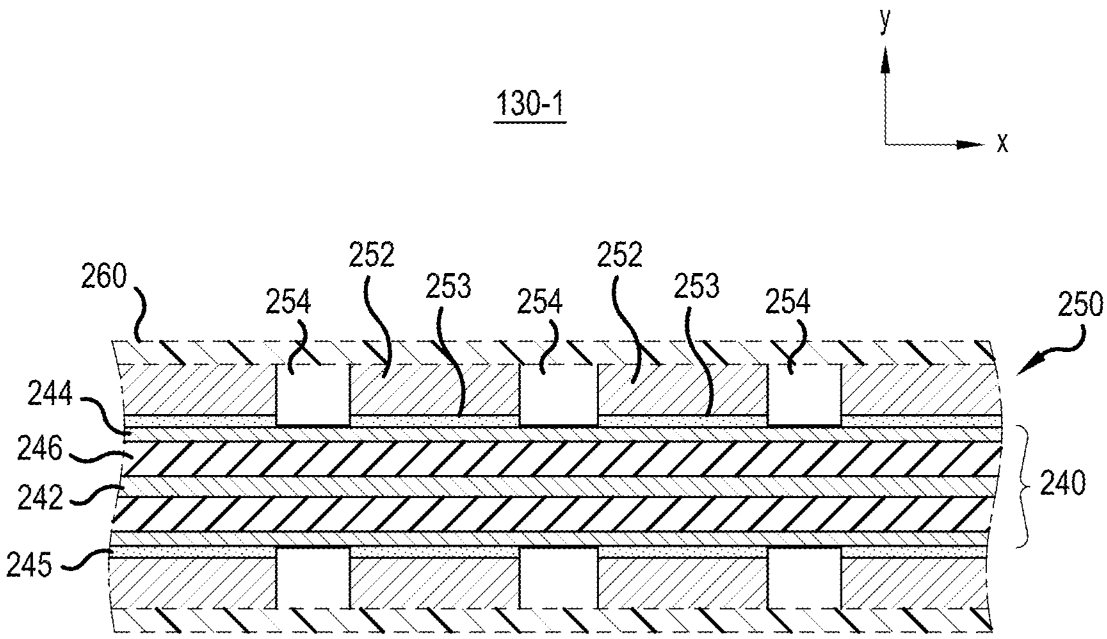
FIG. 2 is a cross-sectional view of a cable assembly in a flexible probe including a flexible magnetic shield with air gaps between ferrite beads, according to a representative embodiment.

FIG. 2 is a cross-sectional view of a cable assembly in a flexible probe including a flexible magnetic shield with air gaps between ferrite beads, according to a representative embodiment. The depicted cable assembly may be an embodiment of the cable assembly 130 in the probe 155 discussed above with reference to FIG. 1.

Referring to FIG. 2, cable assembly 130-1 includes a coaxial cable 240, a flexible magnetic shield 250, and an optional protective casing 260. The coaxial cable 240 includes an inner conductor 242 (e.g., signal conductor) and an outer conductor 244 (e.g., reference conductor) for conducting the test signal received from the DUT 110 via the inner and outer signal contacts, respectively. The coaxial cable 240 further includes an insulating layer 246 that electronically insulates the outer conductor 244 from the inner conductor 242. The inner and outer conductors 242 and 244 may be formed electrically conductive materials, and the insulating layer 246 may be formed of a dielectric or electrically insulating material. There may also be an outer insulating layer or jacket 245 surrounding the outer conductor 244.

The flexible magnetic shield 250 includes multiple ferrite beads 252 (or ferrite segments) spaced apart from one another by intervening air gaps 254 along a length of the coaxial cable 240 in the longitudinal direction (x-axis). The air gaps 254 enable the ferrite beads 252 to tilt toward one another (through the empty space of the air gaps 254) as the coaxial cable 240 flexes, such that the ferrite beads 252 do not inhibit the flexibility of the cable assembly 130-1. The ferrite beads 252 may be rigid, and may be formed of any compatible magnetic material, such as ferrite material, for example, such that the flexible magnetic shield 250 shields the coaxial cable from electrical interference and electromagnetic radiation. The magnetic material may be non-electrically conductive or electrically conductive, without departing from the scope of the present teachings.

The thickness in the lateral direction (y-axis) and width in the longitudinal direction of each of the ferrite beads 252 are large enough to provide the desired level of electromagnetic shielding, while the width of each of the intervening air gaps 254 is large enough to enable the desired amount of flexing without compromising the electromagnetic shielding. In the depicted embodiment, the air gaps 254 are empty, meaning that there are no additional materials located within the air gaps 254.

In order to physically secure the ferrite beads 252 in place, they are attached to the outer surface of the coaxial cable 240, which may be the jacket 245 or the outer conductor 244 (when there is no jacket 245) by adhesive portions 253. The adhesive portions 253 may be any compatible adhesive material capable of attaching the ferrite beads 252 to the outer surface of the coaxial cable 240, such as glue (e.g., PERMABOND® 200 Ethyl Cyanoacrylate Adhesive), or epoxy, for example, as would be apparent to one skilled it the art. In the depicted configuration, the adhesive portions 253 appear only between each of the ferrite beads 252 and the outer conductor 244. However, the adhesive portions 253 may extend into all or part of the air gaps, without departing from the scope of the present teachings.

The protective casing 260 is optional, as indicated by dashed lines, and surrounds the flexible magnetic shield 250 and the coaxial cable 240. The protective casing 260 is configured to provide protection from the ambient environment, and may be formed of any compatible insulating material that provides adequate protection without hampering flexibility of the cable assembly 130-1.

Figure 3A:
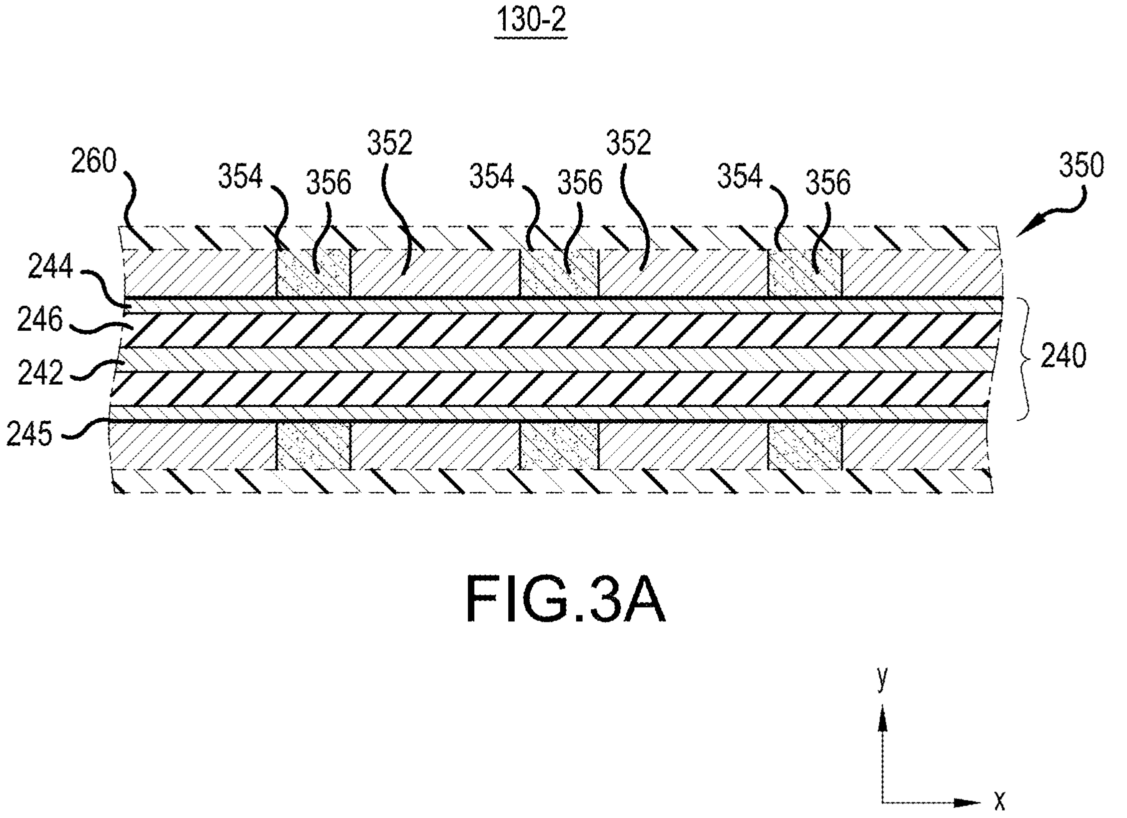
FIG. 3A is a cross-sectional view of a cable assembly in a flexible probe including a flexible magnetic shield with crushable spacers between ferrite beads, according to a representative embodiment.
Figure 3B:
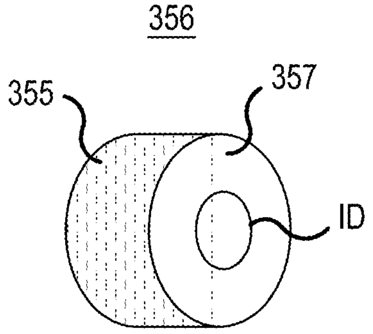
FIG. 3B is a perspective view of a crushable spacer to be placed between ferrite beads, according to a representative embodiment.

FIG. 3A is a cross-sectional view of a cable assembly in a flexible probe having crushable spacers, and FIG. 3B is a perspective view of a crushable spacer to be placed between ferrite beads, according to a representative embodiment. The depicted cable assembly 130-2 is an embodiment of the cable assembly 130 in the probe 155 discussed above. Throughout the disclosure, discussion of elements with like reference numerals from previous figures will not be repeated for the sake of convenience.

Referring to FIG. 3A, cable assembly 130-2 includes coaxial cable 240, a flexible magnetic shield 350, and protective casing 260. The flexible magnetic shield 350 includes multiple ferrite beads 352 spaced apart from one another by intervening gaps 354 containing crushable spacers 356, respectively, along a length of the coaxial cable 240 in the longitudinal direction (x-axis). The crushable spacers 356 have a width that is substantially the same as the width of the gaps 354 in the longitudinal direction such that they physically hold the adjacent ferrite beads 352 in position along the coaxial cable 240. The height of the crushable spacers 356 in the lateral direction (y-axis) may be substantially the same as that of the ferrite beads 352 or less.

Further, the crushable spacers 356 are sufficiently rigid to maintain the desired separation of the adjacent ferrite beads 352, but may be compressed or "crushed" in response to pressure applied by adjacent ferrite beads 352 in response to bending of the cable assembly 130-2. This enables the ferrite beads 352 to tilt toward one another as the coaxial cable 240 flexes, such that the ferrite beads 352 do not inhibit the flexibility of the cable assembly 130-2.

Referring to FIG. 3B, the crushable spacer 356 includes crushable portion 355 formed of an electrically insulating, crushable material, such as foam, foam board (e.g., Styrofoam) or cardboard, for example. The crushable portion 355 is contained in a collapsible casing 357, formed of paper or plastic, for example. The crushable material is not elastomeric in that it does not return to its original dimensions. Each of the crushable spacers 356 also has an inner diameter ID that is substantially same as the outer diameter of the coaxial cable 240, such that the crushable spacers 356 may be slipped over the coaxial cable 240.

In alternative embodiments, separation of the ferrite beads may be maintained by rigid spacers, and enable flexing of the cable assembly by virtue of their shapes. Examples of rigid spacers are discussed below with reference to FIGS. 4A-7C, where the rigid spacers are formed of non-compressible, non-elastomeric materials, such as rigid polymers, metals, and ceramics, for example. In various embodiments, the rigid spacers may be formed of the same material as the ferrite beads, such as ferrite material, for example.

Figure 4A:
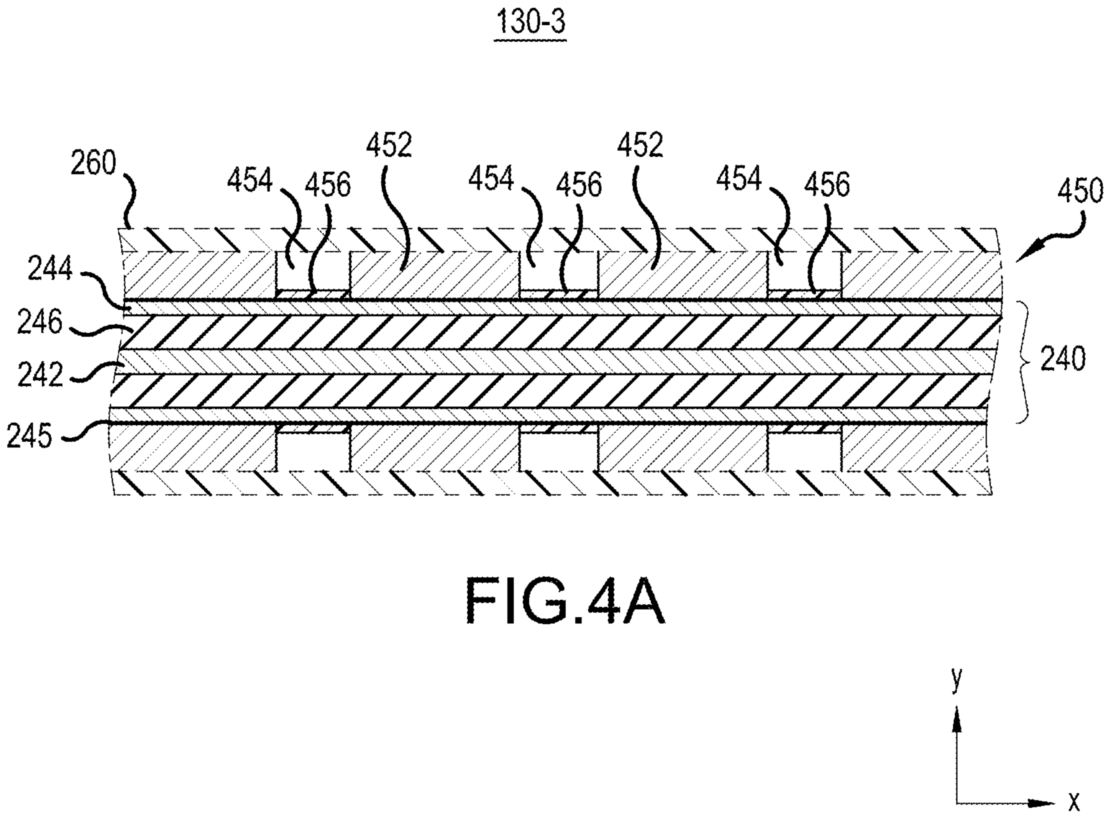
FIG. 4A is a cross-sectional view of a cable assembly in a flexible probe including a flexible magnetic shield with low profile spacers between ferrite beads, according to a representative embodiment.
Figure 4B:
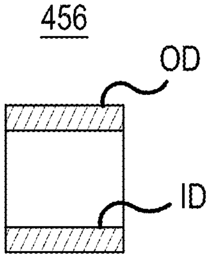
FIG. 4B is a magnified cross-sectional view of a low profile spacer to be placed between ferrite beads, according to a representative embodiment.
Figure 4C:
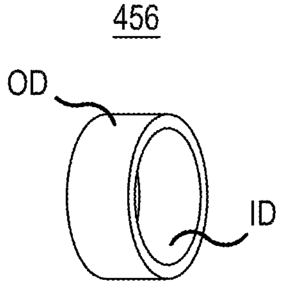
FIG. 4C is a perspective view of a low profile spacer to be placed between ferrite beads, according to a representative embodiment.

FIG. 4A is a cross-sectional view of a cable assembly in a flexible probe having low profile rigid spacers, according to a representative embodiment. FIG. 4B is a cross-sectional view and FIG. 4C is a perspective view of a low profile spacer to be placed between ferrite beads, according to a representative embodiment. The depicted cable assembly 130-3 is an embodiment of the cable assembly 130 in the probe 155 discussed above.

Referring to FIGS. 4A, 4B and 4C, cable assembly 130-3 includes coaxial cable 240, a flexible magnetic shield 450, and protective casing 260. The flexible magnetic shield 450 includes multiple ferrite beads 452 spaced apart from one another by intervening gaps 454 containing low profile spacers 456, respectively, along a length of the coaxial cable 240 in the longitudinal direction (x-axis). The low profile spacers 456 are formed of rigid material, discussed above, and have a width that is substantially the same as the width of the gaps 454 in the longitudinal direction such that they physically hold the adjacent ferrite beads 452 in position along the coaxial cable 240. However, an outer diameter OD of each of the low profile spacers 456 is less than the thickness of the ferrite beads 452 in the lateral direction (y-axis). This enables the ferrite beads 452 to tilt toward one another as the coaxial cable 240 flexes, such that the ferrite beads 452 do not inhibit the flexibility of the cable assembly 130-3. The remainder of each of the gaps 454, not filled by the low profile spacer 456, is empty.

The size of the outer diameter OD of the low profile spacer 456 defines the amount by which the ferrite beads 452 may flex toward one another in response to bending of the coaxial cable 240. Generally, the smaller the outer diameter OD of the low profile spacer 456, the more the ferrite beads 452 are able to tilt, and thus the greater the flexibility of the cable assembly 130-3. Typically, the outer diameter OD of the low profile spacer 456 is less than half the thickness of the ferrite beads 452. Of course, the narrower the outer diameter of the low profile spacer 456, the greater the range of motion of the ferrite beads 452 and thus the flexibility of the cable assembly 130-3. Each of the low profile spacers 456 also has an inner diameter ID that is substantially same as the outer diameter of the coaxial cable 240, such that the low profile spacers may be slipped over the coaxial cable 240.

Figure 5A:
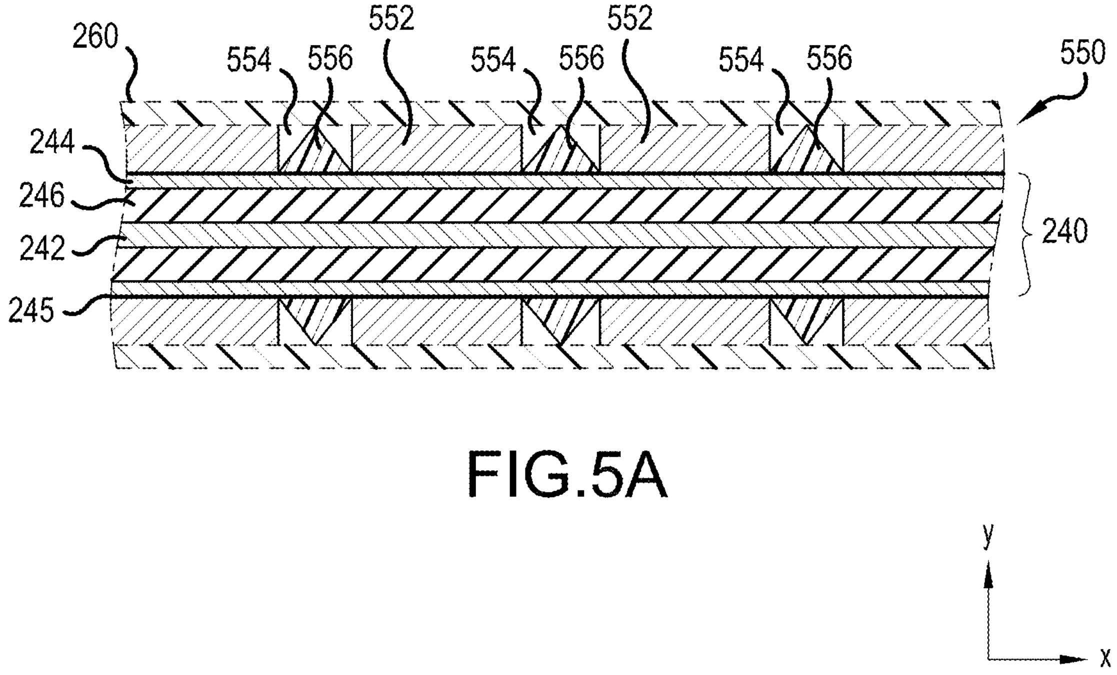
FIG. 5A is a cross-sectional view of a cable assembly in a flexible probe including a flexible magnetic shield with tapered spacers between ferrite beads, according to a representative embodiment.
Figure 5B:
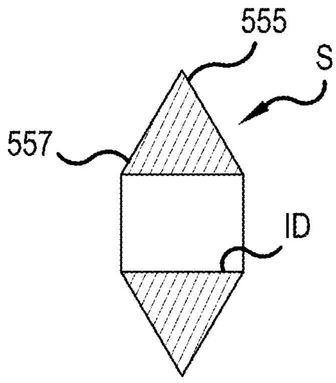
FIG. 5B is a magnified cross-sectional view of a tapered spacer to be placed between ferrite beads, according to a representative embodiment.
Figure 5C:
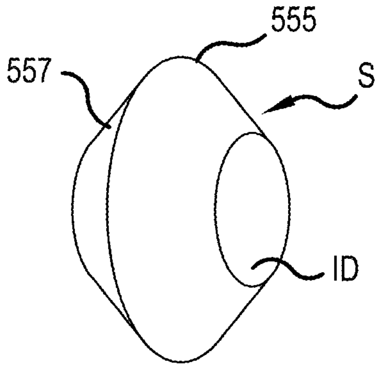
FIG. 5C is a perspective view of a tapered spacer to be placed between ferrite beads, according to a representative embodiment.

FIG. 5A is a cross-sectional view of a cable assembly in a flexible probe including a flexible magnetic shield with tapered spacers between ferrite beads, according to a representative embodiment. FIG. 5B is a cross-sectional view and FIG. 5C is a perspective view of an illustrative tapered spacer to be placed between ferrite beads, according to a representative embodiment. The depicted cable assembly 130-4 is an embodiment of the cable assembly 130 in the probe 155 discussed above.

Referring to FIG. 5A, cable assembly 130-4 includes coaxial cable 240, a flexible magnetic shield 550, and protective casing 260. The flexible magnetic shield 550 includes multiple ferrite beads 552 spaced apart from one another by intervening gaps 554 containing tapered spacers 556, respectively, along a length of the coaxial cable 240 in the longitudinal direction (x-axis). The tapered spacers 556 are formed of rigid material, discussed above, and have a width adjacent the outer conductor 244 (bottom) that is substantially the same as the width of the gaps 554 in the longitudinal direction such that they physically hold the adjacent ferrite beads 552 in position along the coaxial cable 240. Each of the tapered spacers 556 then tapers in the lateral direction (y-axis) away from the outer conductor 244 to a height that is substantially the same as the ferrite beads 552 or less. This enables the ferrite beads 552 to tilt toward one another as the coaxial cable 240 flexes, such that the ferrite beads 552 do not inhibit the flexibility of the cable assembly 130-4. The remainder of each of the gaps 554, not filled by the tapered spacers 556, is empty.

Referring to FIGS. 5B and 5C, each of the tapered spacers 556 has a tapered portion 555 having a slope S that tapers inward form a base portion 557. The slope S may complement the angle of the adjacent ferrite beads 552 when they are in their maximum tilted positions, which correspond to the maximum flex available to the coaxial cable 240 by the flexible magnetic shield 550. The tapered portion 555 may define an apex, as in the example shown in FIG. 5B, in which case the tapered portion 555 has a substantially triangular shape. Alternatively, the tapered portion 555 may be truncated short of an apex, in which case the tapered portion 555 has a substantially trapezoidal shape, without departing from the scope of the present teachings. Each of the tapered spacers 556 also has an inner diameter ID that is substantially same as the outer diameter of the coaxial cable 240, such that the tapered spacers 556 may be slipped over the coaxial cable 240.

Figure 6A:
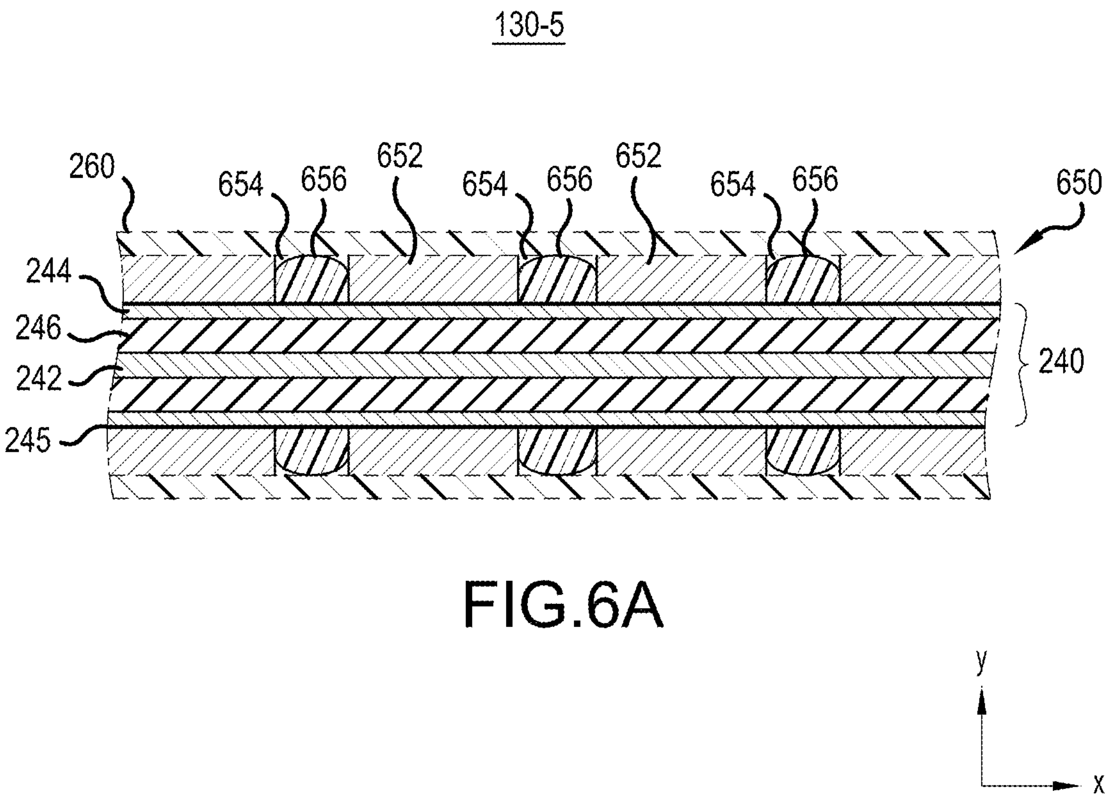
FIG. 6A is a cross-sectional view of a cable assembly in a flexible probe including a flexible magnetic shield with rounded spacers between ferrite beads, according to a representative embodiment.
Figure 6B:
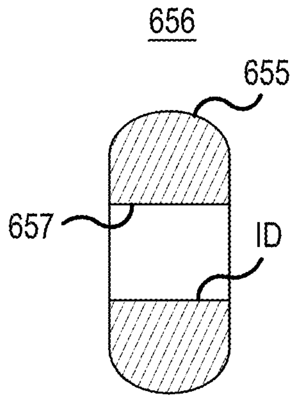
FIG. 6B is a magnified cross-sectional view of a rounded spacer to be placed between ferrite beads, according to a representative embodiment.

FIG. 6A is a cross-sectional view of a cable assembly in a flexible probe including a flexible magnetic shield with rounded spacers between ferrite beads, according to a representative embodiment. FIG. 6B is a cross-sectional view and FIG. 6C is a perspective view of a rounded spacer to be placed between ferrite beads, according to a representative embodiment.

Referring to FIG. 6A, cable assembly 130-5 includes coaxial cable 240, a flexible magnetic shield 650, and protective casing 260. The flexible magnetic shield 650 includes multiple ferrite beads 652 spaced apart from one another by intervening gaps 654 containing rounded spacers 656, respectively, along a length of the coaxial cable 240 in the longitudinal direction (x-axis). The rounded spacers 656 are formed of rigid material, discussed above, and have a width adjacent the outer conductor 244 (bottom) that is substantially the same as the width of the gaps 654 in the longitudinal direction such that they physically hold the adjacent ferrite beads 652 in position along the coaxial cable 240. Each of the rounded spacers 656 is rounded at the end opposite from the outer conductor 244 in the lateral direction (y-axis). This enables the ferrite beads 652 to tilt toward one another as the coaxial cable 240 flexes, such that the ferrite beads 652 do not inhibit the flexibility of the cable assembly 130-5.

Figure 6C:
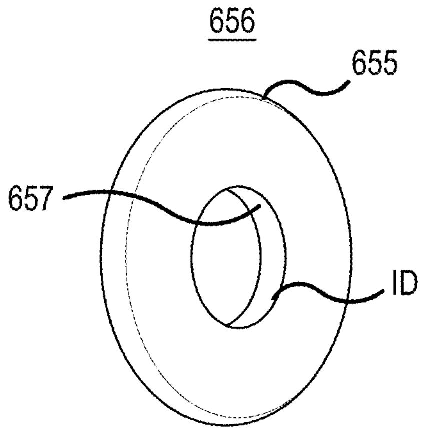
FIG. 6C is a perspective view of a rounded spacer to be placed between ferrite beads, according to a representative embodiment.

Referring to FIGS. 6B and 6C, each of the rounded spacers 656 has a base portion 657 in contact with the outer conductor 244 and a rounded portion 655 opposite the base portion 657. The curve of the rounded portion 655, together with the height of the rounded spacers 656 relative to the ferrite beads 652, allows the adjacent ferrite beads 652 to tilt toward one another. The points of contact between the rounded portion 655 and the adjacent ferrite beads 652 define the maximum tilted positions of the ferrite beads 652, which correspond to the maximum flex available to the coaxial cable 240. Each of the rounded spacers 656 also has an inner diameter ID that is substantially same as the outer diameter of the coaxial cable 240, such that the rounded spacers 656 may be slipped over the coaxial cable 240.

Figure 7A:
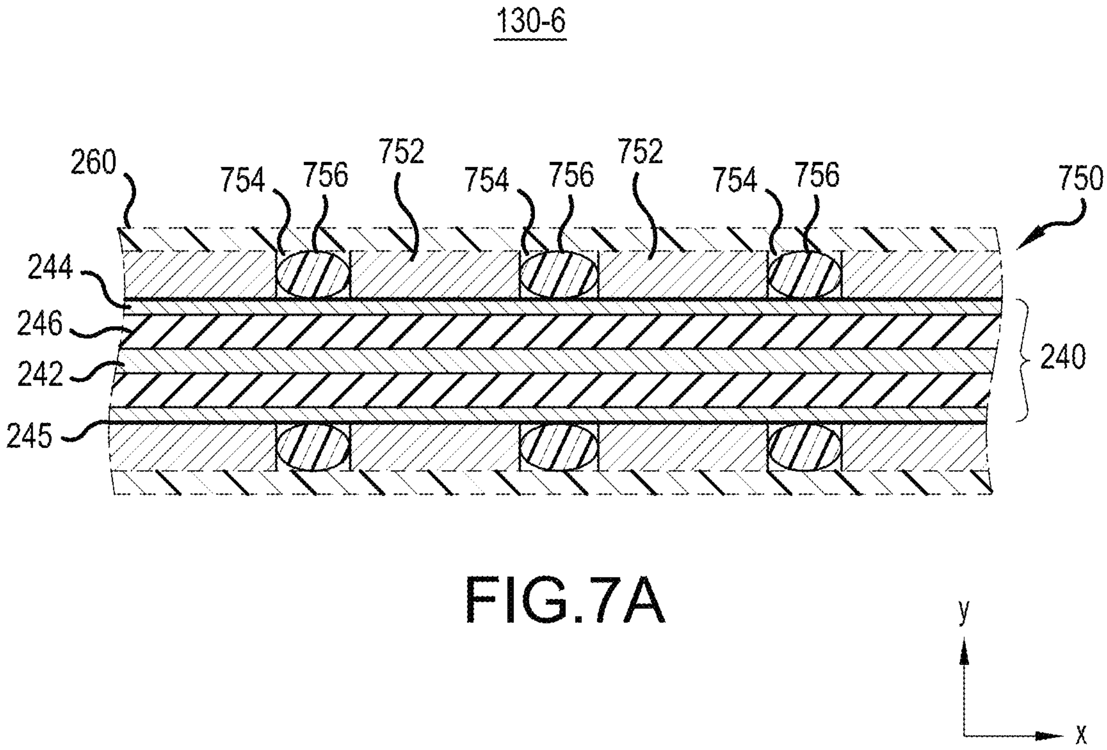
FIG. 7A is a cross-sectional view of a cable assembly in a flexible probe including a flexible magnetic shield with torus or toroid spacers between ferrite beads, according to a representative embodiment.
Figure 7B:
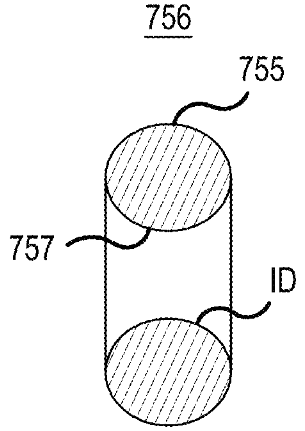
FIG. 7B is a magnified cross-sectional view of a torus or toroid spacer to be placed between ferrite beads, according to a representative embodiment.

FIG. 7A is a cross-sectional view of a cable assembly in a flexible probe including a flexible magnetic shield with torus or toroid spacers between ferrite beads, according to a representative embodiment. FIG. 7B is a cross-sectional view and FIG. 7C is a perspective view of a torus or toroid spacer to be placed between ferrite beads, according to a representative embodiment.

Referring to FIG. 7A, cable assembly 130-6 includes coaxial cable 240, a flexible magnetic shield 750, and protective casing 260. The flexible magnetic shield 750 includes multiple ferrite beads 752 spaced apart from one another by intervening gaps 754 containing torus or toroid spacers 756, respectively, along a length of the coaxial cable 240 in the longitudinal direction (x-axis). The torus or toroid spacers 756 are formed of rigid material, discussed above, and are substantially donut shaped in that they are rounded at both an inner diameter ID adjacent the outer conductor 244 (bottom) and an outer diameter OD opposite the outer conductor 244 (top). The torus or toroid spacers 756 are torus shaped when they have circular cross-sections and toroid shaped when they have oval cross-sections. The width of each of the torus or toroid spacers 756 at the center diameter (widest portion) is substantially the same as the width of the gaps 754 in the longitudinal direction such that they physically hold the adjacent ferrite beads 752 in position along the coaxial cable 240. The rounded portion of each of the at the torus or toroid spacers 756 at the end opposite from the outer conductor 244 in the lateral direction (y-axis), enables the ferrite beads 752 to tilt toward one another as the coaxial cable 240 flexes, such that the ferrite beads 752 do not inhibit the flexibility of the cable assembly 130-6.

Figure 7C:
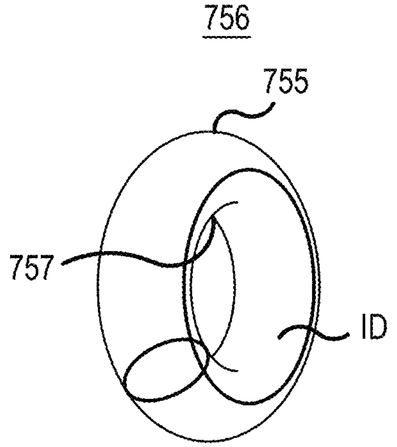
FIG. 7C is a perspective view of a torus or toroid spacer to be placed between ferrite beads, according to a representative embodiment.

Referring to FIGS. 7B and 7C, each of the rounded spacers 756 has an inner rounded portion 757 in contact with the outer conductor 244 and an outer rounded portion 755 opposite the inner rounded portion 757. The curve of the outer rounded portion 755, together with the height of the torus or toroid spacers 756 relative to the ferrite beads 752, allows the adjacent ferrite beads 752 to tilt toward one another. The points of contact between the outer rounded portion 755 and the adjacent ferrite beads 752 define the maximum tilted positions of the ferrite beads 752, which correspond to the maximum flex available to the coaxial cable 240. The inner diameter ID of each of the torus or toroid spacers 756 is substantially same as the outer diameter of the coaxial cable 240, such that each of the torus or toroid spacers 756 may be slipped over the coaxial cable 240.

Referring to FIGS. 4A-7C, the illustrative rigid spacers (e.g., the low profile spacers 456, the tapered spacers 556, the rounded spacers 656, and the torus or toroid spacers 756) may be formed of any compatible material, including rigid polymers, metals, and ceramics, for example. As mentioned above, in an embodiment, the spacers may be formed of the same magnetic material as the ferrite beads, such as ferrite material, for example. This improves the electromagnetic shielding provided by the flexible magnetic shields since there are no portions of the coaxial cable 240 exposed through gaps between adjacent ferrite beads.

In the embodiments discussed above, the various elements of the flexible magnetic shields (e.g., flexible magnetic shields 250, 350, 450, 550, 650, 750) that enable the flexing of the coaxial cable 240, including gaps and spacers, are present only in the cable assembly 130. That is, these elements are not present in the RF connector 120 or the T&M connector 140.

Figure 8:
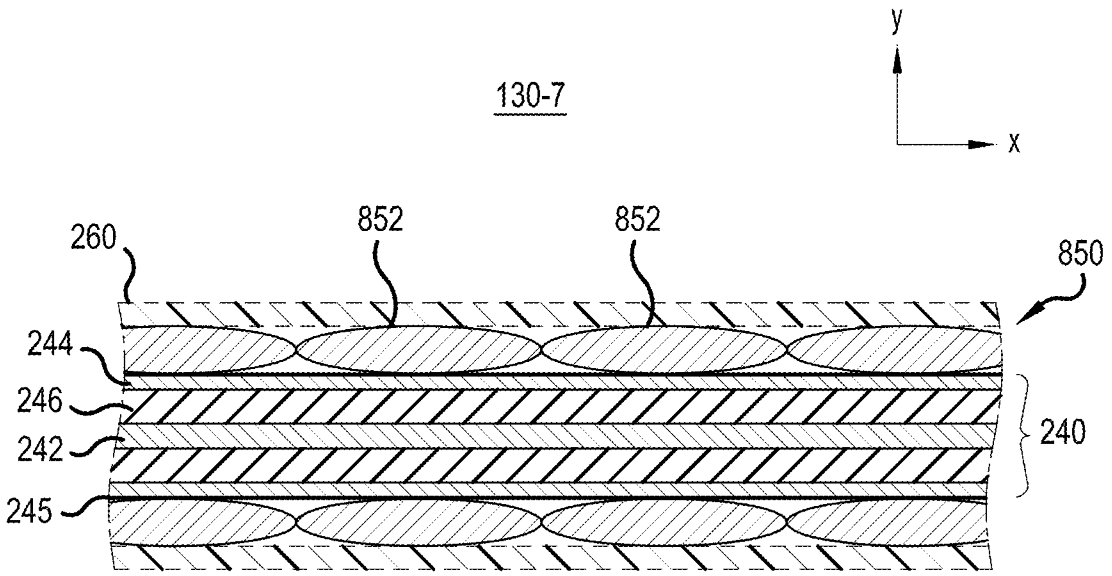
FIG. 8 is a cross-sectional view of a cable assembly in a flexible probe including a flexible magnetic shield with abutting ferrite beads, according to a representative embodiment.

In alternative embodiments, flexibility of the flexible magnetic shield is provided based on the configuration of the ferrite beads, without incorporation of intervening spacers. In this context, FIG. 8 is a cross-sectional view of a cable assembly in a flexible probe including a flexible magnetic shield with abutting ferrite beads, according to a representative embodiment. Again, the depicted cable assembly 130-7 is an embodiment of the cable assembly 130 in the probe 155 discussed above.

Referring to FIG. 8, cable assembly 130-7 includes coaxial cable 240, a flexible magnetic shield 850, and protective casing 260. The flexible magnetic shield 850 includes multiple abutting ferrite beads 852 arranged end-to-end along a length of the coaxial cable 240 in the longitudinal direction (x-axis). The ferrite beads 852 have rounded end portions in the longitudinal direction, where adjacent ferrite beads 852 touch one another at the respective rounded end portions. The rounded end portions enable the ferrite beads 852 to tilt toward one another as the coaxial cable 240 flexes, such that the ferrite beads 852 do not inhibit the flexibility of the cable assembly 130-7.

In the depicted embodiment, each of the ferrite beads 852 has a substantially toroid shape, were the ends of the elliptical cross-section of the toroid shape contact the respective ends of the adjacent toroid shaped ferrite beads 852. In alternative embodiments, the ferrite beads 852 may have different shapes with rounded edges, such as a substantially rectangular shape with rounded corners, without departing from the scope of the present teachings.

Figure 9:
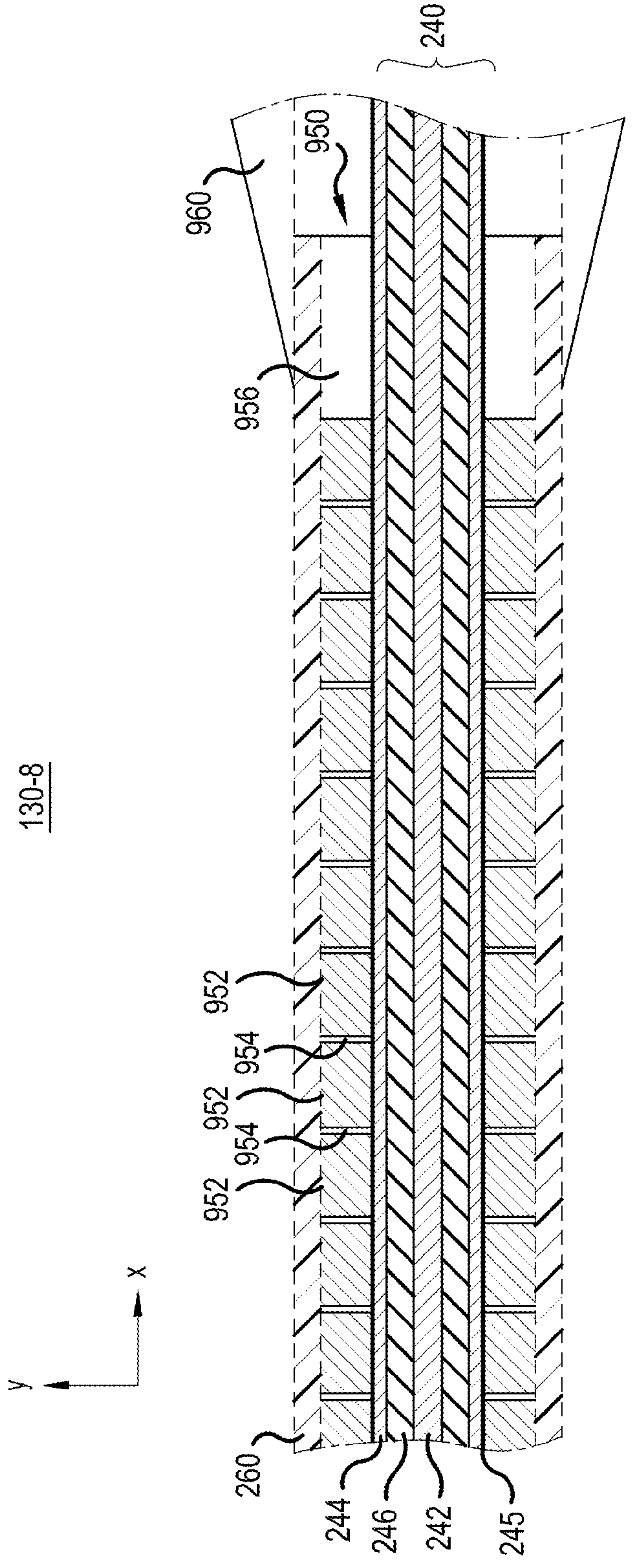
FIG. 9 is a cross-sectional view of a cable assembly in a flexible probe including a flexible magnetic shield with flexible air gaps between ferrite beads, according to a representative embodiment.

FIG. 9 is a cross-sectional view of a cable assembly in a flexible probe including a flexible magnetic shield with flexible air gaps between ferrite beads, according to a representative embodiment.

Referring to FIG. 9, cable assembly 130-8 includes coaxial cable 240, a flexible magnetic shield 950, and protective casing 260. The flexible magnetic shield 950 includes multiple ferrite beads 952 slidably positioned side-by-side along a length of the coaxial cable 240 in the longitudinal direction (x-axis). The ferrite beads 952 may have substantially rectangular shapes, as shown. Alternatively, the ferrite beads 952 have a shape other than rectangular, such as a substantially rectangular shape with rounded corners, a substantially square shape with or without rounded corners, or a substantially circular or elliptical shape, without departing from the scope of the present teachings.

In the depicted embodiments, adjacent ones of the ferrite beads 952 are not separated by spacers and are not attached to the outer surface of the coaxial cable 240 by an adhesive. In addition, the flexible magnetic shield 950 includes end space 956 at one or both ends of the cable assembly 130-8. The end space 956 is an air gap at one or both ends of the row of ferrite beads 952 and defined by the space between the coaxial cable 240 and the protective casing 260. Because the ferrite beads 952 are not attached to the outer surface of the coaxial cable 240 and the end space(s) 956 provide free space, the ferrite beads 952 are free to move along a longitudinal axis of the flexible magnetic shield 950 in response to bending or manipulation of the cable assembly 130-8. Because there are no spacers forcing separation of the ferrite beads 952, adjacent ones of the ferrite beads 952 may be in contact with one another, depending on the total number of ferrite beads 952, the sizes of the end space(s) 956, and the shape of the flexible magnetic shield 950.

In the depicted embodiment, the end space 956 is shown between the protective casing 260 and the coaxial cable 240 at a proximal end of the cable assembly 130-8. The cable assembly 130-8 may also include an end connector 960 attached to the proximal end of the coaxial cable 240, where the end connector 960 is configured to releasably connect the coaxial cable 240 to another compatible connector (e.g., of another coaxial cable or a terminal). It is understood, however, that the end space 956 may be at the distal end of the cable assembly 130-8 instead, or at both the proximal and distal ends of the cable assembly 130-8.

Because of the empty air space provided by the one or more end spaces 956, adjacent ones of the ferrite beads 952 may move to be in contact with one another or spaced apart from one another by various distances or air gaps, indicated by representative air gaps 954, as the cable assembly 130-8 bends or is otherwise manipulated. When air gaps 954 are present, they may be the same or different sizes without departing from the present teachings. Since the ferrite beads 952 may move along the longitudinal axis, they do not inhibit flexibility of the cable assembly 130-8. Notably, the sizes and shapes of the ferrite beads 952 in the longitudinal direction affect the flexibility, where shorter and/or more rounded ferrite beads 952 generally enable greater flexibility of the cable assembly 130-8 as compared to longer and/or less rounded ferrite beads 952.

In the foregoing embodiments, the cable assemblies have air gaps between adjacent ferrite beads, some of which contain spacers (e.g., rigid spacers or crushable spacers) to substantially maintain separation between the ferrite beads. In some of the embodiments, the spacers may be formed of the same magnetic material as the ferrite beads to provide additional shielding by preventing exposure of the coaxial cable through gaps between adjacent ferrite beads. However, additional embodiments of the flexible cable assemblies may include gapless ferrite beads, where no air gaps exist between the adjacent ferrite beads.

Figure 10A:
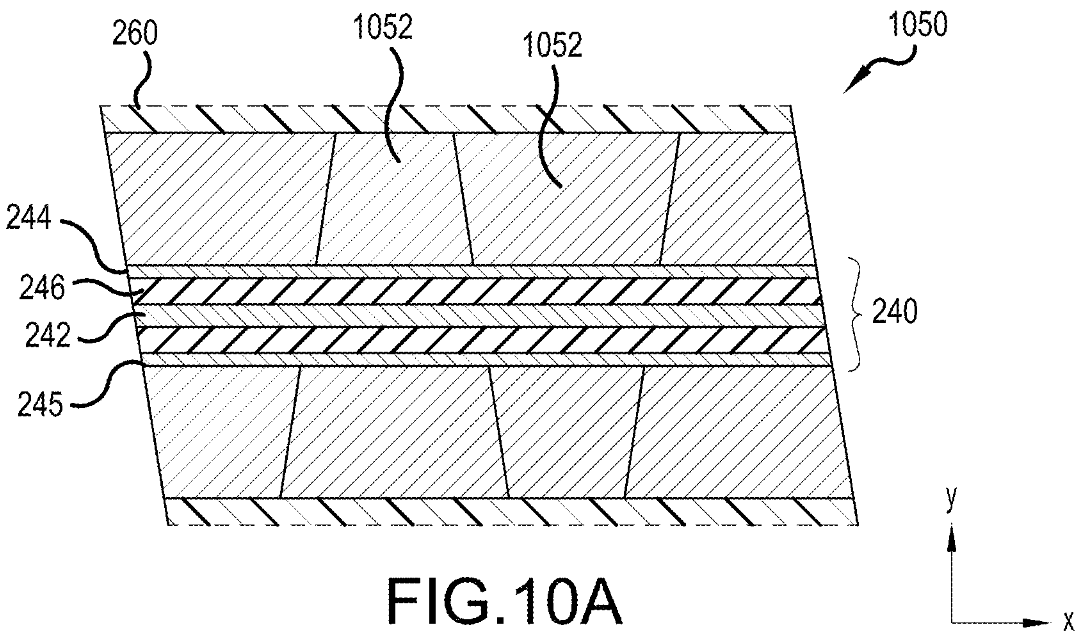
FIG. 10A is a cross-sectional view of a cable assembly in a flexible probe including a flexible magnetic shield with rotatable ferrite beads having tapered shapes arranged in opposite orientations, according to a representative embodiment.
Figure 10B:
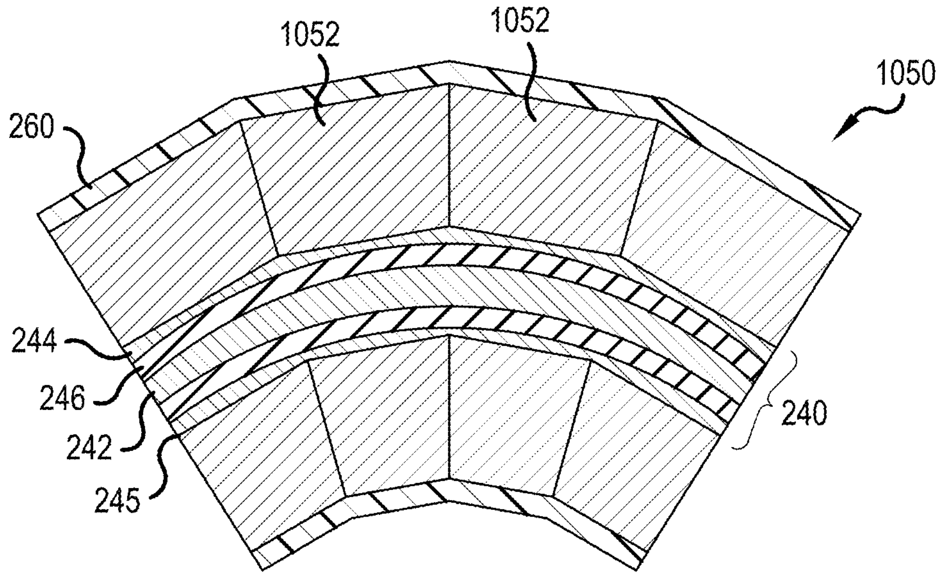
FIG. 10B is a cross-sectional view of a cable assembly in a flexible probe including a flexible magnetic shield with rotatable ferrite beads having tapered shapes arranged in the same orientation, according to a representative embodiment.

FIGS. 10A and 10B are cross-sectional views of a cable assembly in a flexible probe including a flexible magnetic shield with gapless, rotatable ferrite beads having tapered shapes, according to a representative embodiment. Referring to FIGS. 10A and 10B, cable assembly 130-9 includes coaxial cable 240, a flexible magnetic shield 1050, and protective casing 260. The coaxial cable 240 includes inner conductor 242 and outer conductor 244 for conducting the test signal via the inner and outer signal contacts, respectively. The coaxial cable 240 further includes the insulating layer 246 that electronically insulates the outer conductor 244 from the inner conductor 242. The outer insulating layer or jacket 245 may be included, surrounding the outer conductor 244.

The flexible magnetic shield 1050 includes multiple ferrite beads 1052 arranged adjacent to one another, without intervening gaps, along a length of the coaxial cable 240 in the longitudinal direction (x-axis) when there is no bending of the cable assembly 130-9. Each of the ferrite beads 1052 has a tapered shape, and is freely rotatable around a longitudinal axis L of the cable assembly 130-9. In the depicted embodiment, the tapered shape of the ferrite beads 1052 is a substantially trapezoidal shape, as discussed below. However, other tapered shapes, such as a substantially triangular shape in which the shorter end of the substantially trapezoidal shape approaches a point, may be incorporated without departing from the scope of the present teachings. Also, in the depicted embodiment, the ferrite beads 1052 are the same size and shape, for ease of illustration. It is understood, however, that the ferrite beads 1052 may have different sizes and shapes relative to one another, without departing from the scope of the present teachings.

Figure 11A:
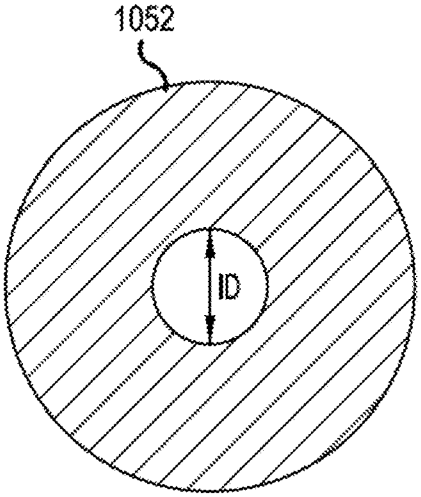
FIG. 11A is a depth cross-sectional view of a tapered ferrite bead having a trapezoidal shape, according to a representative embodiment.
Figure 11B:
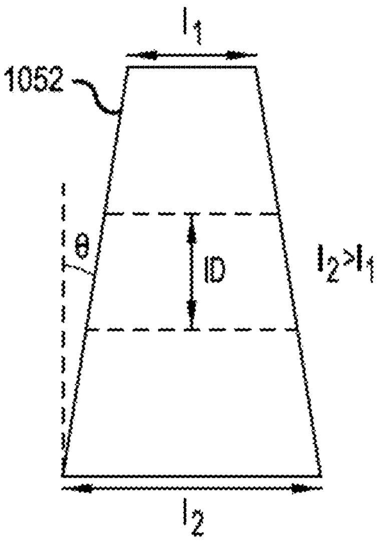
FIG. 11B is a longitudinal cross-sectional view of the tapered ferrite bead having the trapezoidal shape, according to a representative embodiment.
Figure 11C:
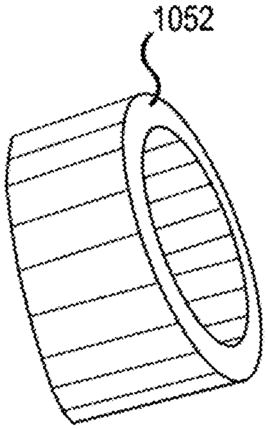
FIG. 11C is a perspective view of the tapered ferrite bead having the trapezoidal shape, according to a representative embodiment.

FIG. 11A is a depth cross-sectional view of a tapered ferrite bead having a trapezoidal shape, FIG. 11B is a longitudinal cross-sectional view of the tapered ferrite bead having the trapezoidal shape, and FIG. 11C is a perspective view of the tapered ferrite bead having the trapezoidal shape, according to a representative embodiment. An inner diameter ID of the ferrite bead 1052 is slightly larger than an outer diameter of the coaxial cable 240 (e.g., the outer surface of the insulating layer or jacket 245), enabling rotation of the ferrite bead 1052 around the coaxial cable 240. The inner diameter ID may be small enough to enable a tight fit between the ferrite bead 1052 and the coaxial cable 240, such that the rotational position of the ferrite bead 1052 may be maintained by friction with the coaxial cable 240. Alternatively or in additional, the rotational position of the ferrite bead 1052 may be maintained by contact with adjacent ferrite beads 1052.

The ferrite bead 1052 has a long end $l_2$ and a short end 11 that are opposite one another in the lateral direction (y-axis). Opposing sides of the ferrite bead 1052 are sloped or tapered inwardly from the long end $l_2$ toward the short end $l_1$ at a predetermined angle, indicated as angle θ In the depicted embodiment, the both opposing sides are angled equally for purposes of illustration, although it is understood that the opposing sides may slope or taper toward the short end $l_1$ at different angles without departing from the scope of the present teachings.

Referring again to FIG. 10A, adjacent ones of the rotatable ferrite beads 1052 are arranged in opposite rotational orientations. This means that the long end ($l_2$) of one ferrite bead 1052 is aligned is aligned in the direction along the longitudinal axis L with the short end ($l_1$) of adjacent ferrite beads 1052. In other words, the ferrite beads 1052 are arranged such that the long ends and short ends of adjacent ferrite beads 1052 alternate in the longitudinal direction, resulting in the cable assembly 130-9 and the coaxial cable 240 being straight (having no bend).

In order to bend the cable assembly 130-9, the ferrite beads 1052 are rotated relative to one another to alter the positional relationships between adjacent ferrite beads 1052, thereby changing the shape of the cable-assembly 130-9 and the coaxial cable 240 as desired. For example, referring again to FIG. 10B, adjacent ones the rotatable ferrite beads 1052 are arranged in the same orientation. This means that the long end ($l_2$) of one ferrite bead 1052 is aligned in the direction along the longitudinal axis L with the long end ($l_2$) of the adjacent ferrite beads 1052. Likewise, the short end (11) of one ferrite bead 1052 is aligned in the direction along the longitudinal axis L with the short end (11) of the adjacent ferrite beads 1052. In other words, the long ends of the adjacent ferrite beads 1052 align in the longitudinal direction and the short ends of the adjacent ferrite beads 1052 align in the longitudinal direction, resulting in the cable assembly 130-9 and the coaxial cable 240 bending. In the arrangement shown in FIG. 10B, the cable assembly 130-9 and the coaxial cable 240 have a bend with a constant curvature since all of the depicted ferrite beads 1052 are arranged in the same orientation relative to the longitudinal axis L.

Figure 12:
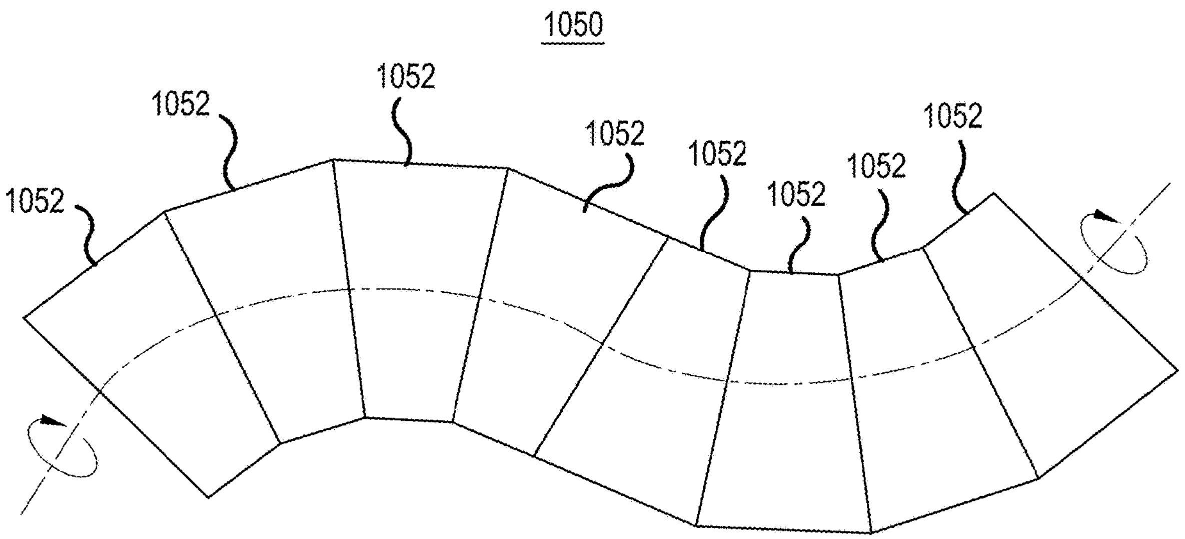
FIG. 12 is an extended cross-sectional view of a cable assembly in a flexible probe including a flexible magnetic shield with rotatable ferrite beads having tapered shapes arranged the same and opposite orientations, according to a representative embodiment.

As mentioned above, the cable assembly 130-9 may be arranged in different shapes, depending on the orientations of the ferrite beads 1052 selected by the user. FIG. 12 is an extended cross-sectional view of a cable assembly in a flexible probe including a flexible magnetic shield with rotatable ferrite beads having tapered shapes arranged the same and opposite orientations, according to a representative embodiment. As shown in FIG. 12, the first four adjacent ferrite beads 1052 have the same orientation, in which the long end of each of the ferrite beads 1052 is arranged on the top side of the cable assembly 130-9, resulting in a downward curvature of the cable assembly 130-9 in the lateral direction (y-axis). The last four adjacent ferrite beads 1052 have the same orientation, in which the long end of each of the ferrite beads 1052 is arranged on the bottom side of the cable assembly 130-9, resulting in an upward curvature of the cable assembly 130-9 in the lateral direction (y-axis). The two middle adjacent ferrite beads 1052 have opposite orientations, providing in a transition between the downward and upward curvatures of the cable assembly 130-9. The result is a substantially S-shape of the cable assembly 130-9. Of course, other orientational arrangements the ferrite beads 1052 may be implemented to provide different shapes of the cable assembly 130-9 without departing from the scope of the present teachings.

In various embodiments, because the ferrite beads 1052 rotate to provide flexibility in bending the cable assembly 130-9 and the coaxial cable 240, they tend to grind against one another during the rotation. To prevent wear and other damage caused by the grinding, the ferrite beads 1052 may be coated with a fluoropolymer coating, such as a polytetrafluoroethylene (PTFE) coating, for example. The fluoropolymer coating provide low friction contact between adjacent ferrite beads 1052, thereby reducing wear.

While the disclosure has been illustrated and described in detail in the drawings and foregoing description, such illustration and description are to be considered illustrative or exemplary and not restrictive; the disclosure is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

The illustrations of the embodiments described herein are intended to provide a general understanding of the structure of the various embodiments. The illustrations are not intended to serve as a complete description of all of the elements and features of the disclosure described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A cable assembly, comprising:

a coaxial cable;

a plurality of ferrite beads slidably positioned along a length of the coaxial cable in a longitudinal direction and surrounding an outer surface of the coaxial cable for enhancing electromagnetic shielding of the coaxial cable;

a protective casing surrounding the plurality of ferrite beads and the coaxial cable; and at least one end space at a proximal end and/or a distal end of the cable assembly, wherein the at least one end space is defined between the protective casing and the coaxial cable, wherein the at least one end space allows movement of the plurality of ferrite beads in the longitudinal direction, enabling flexing movements between adjacent ferrite beads.

2. The cable assembly of claim 1, wherein the at least one end space is at the proximal end of the cable assembly.

3. The cable assembly of claim 1, wherein the at least one end space is at the distal end of the cable assembly.

4. The cable assembly of claim 1, further comprising:

an end connector attached to the proximal end of the protective casing, wherein the at least one end space is defined within the end connector.

5. The cable assembly of claim 1, wherein each ferrite bead of the plurality of ferrite beads has a substantially rectangular shape.

6. A cable assembly, comprising:

a coaxial cable;

a plurality of ferrite beads spaced apart from one another along a longitudinal length of the coaxial cable and surrounding an outer surface of the coaxial cable for enhancing electromagnetic shielding of the coaxial cable; and a plurality of rigid spacers arranged in gaps separating adjacent ferrite beads of the plurality of ferrite beads, wherein a shape of each of the rigid spacers enables flexing movements between the adjacent ferrite beads.

7. The cable assembly of claim 6, wherein each rigid spacer of the plurality of rigid spacers comprises a tapered rigid spacer tapering downward in a direction away from the outer surface of the coaxial cable, wherein the tapered rigid spacer has a substantially triangular shape or a substantially trapezoidal shape.

8. The cable assembly of claim 6, wherein each rigid spacer of the plurality of rigid spacers comprises a low profile rigid spacer, wherein an outer diameter of the low profile rigid spacer is less than a thickness of each ferrite bead of the plurality of ferrite beads.

9. The cable assembly of claim 6, wherein each rigid spacer of the plurality of rigid spacers comprises a torus or toroid rigid spacer having a rounded surface opposite the outer surface of the coaxial cable and another rounded surface adjacent the outer surface of the coaxial cable, and wherein a width of each of the torus or toroid rigid spacers at a center diameter is substantially the same as a width of the gaps such that the torus or toroid rigid spacer physically holds adjacent ferrite beads of the plurality of ferrite beads in position along the coaxial cable.

10. The cable assembly of claim 6, wherein the plurality of rigid spacers are formed of a same material as the plurality of ferrite beads.

11. The cable assembly of claim 6, wherein the plurality of rigid spacers are formed of a rigid polymer material, a rigid metal material, or a rigid ceramic material.

12. A cable assembly, comprising:

a coaxial cable; and a plurality of ferrite beads arranged along a longitudinal axis of the coaxial cable for enhancing electromagnetic shielding of the coaxial cable, wherein each ferrite bead of the plurality of ferrite beads has a tapered cross-sectional shape in a direction along the longitudinal axis, wherein the tapered cross-sectional shape of each ferrite bead in the direction along the longitudinal axis is a substantially trapezoidal shape or substantially a triangular shape, and wherein each ferrite bead of the plurality of ferrite beads is independently rotatable around the longitudinal axis, such that rotation of one or more of the plurality of ferrite beads results in bending of the coaxial cable.

13. The cable assembly of claim 12 wherein adjacent ferrite beads of the plurality of ferrite beads are in contact to prevent gaps between the adjacent ferrite beads.

14. The cable assembly of claim 12, wherein the plurality of ferrite beads are coated with a polytetrafluoroethylene (PTFE) coating to provide low friction contact between adjacent ferrite beads of the plurality of ferrite beads.

15. The cable assembly of claim 12, wherein the tapered cross-sectional shape of each ferrite bead of the plurality of ferrite beads has a short end and a long end opposite the short end in the direction along the longitudinal axis, and wherein when the plurality of ferrite beads are arranged such that the short ends and the long ends of adjacent ferrite beads alternate in the longitudinal direction, the coaxial cable has no bend.

16. The cable assembly of claim 12, wherein the tapered cross-sectional shape of each ferrite bead of the plurality of ferrite beads has a short end and a long end opposite the short end in the direction along the longitudinal axis, and wherein when the plurality of ferrite beads are arranged such that the short ends and the long ends of adjacent ferrite beads align in the longitudinal direction, the coaxial cable has a bend with a constant curvature.

* * * * *